US008857822B1

(12) United States Patent  
Schultz

(10) Patent No.: US 8,857,822 B1
(45) Date of Patent: Oct. 14, 2014

(54) METHODS OF BIKING OR CYCLING ON VARIED SURFACES

(76) Inventor: Darin Albert Schultz, Nicollet, MN (US)

( * ) Notice: Subject to any disclaimer, the term of this patent is extended or adjusted under 35 U.S.C. 154(b) by 4 days.

(21) Appl. No.: 13/135,453

(22) Filed: Jul. 5, 2011

Related U.S. Application Data

(63) Continuation-in-part of application No. 12/321,238, filed on Jan. 15, 2009, now abandoned.

(60) Provisional application No. 60/011,317, filed on Jan. 15, 2008.

(51) Int. Cl.
   *B62B 13/18*      (2006.01)
   *B62B 19/00*      (2006.01)

(52) U.S. Cl.
   USPC .... 280/9; 280/8; 280/10; 280/762; 280/763.1

(58) Field of Classification Search
   USPC ................. 280/8, 9, 10, 762, 763.1
   See application file for complete search history.

(56) References Cited

U.S. PATENT DOCUMENTS

| 850,125 | A | * | 4/1907 | Baldauf | 280/7.14 |
| 2,106,934 | A | * | 2/1938 | Saulnier | 244/108 |
| 2,757,631 | A | * | 8/1956 | Truter | 440/12.62 |
| 3,561,777 | A | * | 2/1971 | Geis | 280/7.12 |
| 3,630,301 | A | * | 12/1971 | Henricks | 180/183 |
| 4,131,292 | A | * | 12/1978 | Swech | 180/183 |
| 4,559,892 | A | * | 12/1985 | Cascallana | 440/12.62 |
| 5,443,405 | A | * | 8/1995 | Zeyger | 440/12 |

* cited by examiner

*Primary Examiner* — Hau Phan
*Assistant Examiner* — Bryan Evans
(74) *Attorney, Agent, or Firm* — Albert W. Davis, Jr.

(57) ABSTRACT

The invention provides a bike with wheels and skis that can be used to ski on the bike downhill in snow and other surface conditions. The bike can also be used to travel on many different surface conditions.

3 Claims, 10 Drawing Sheets

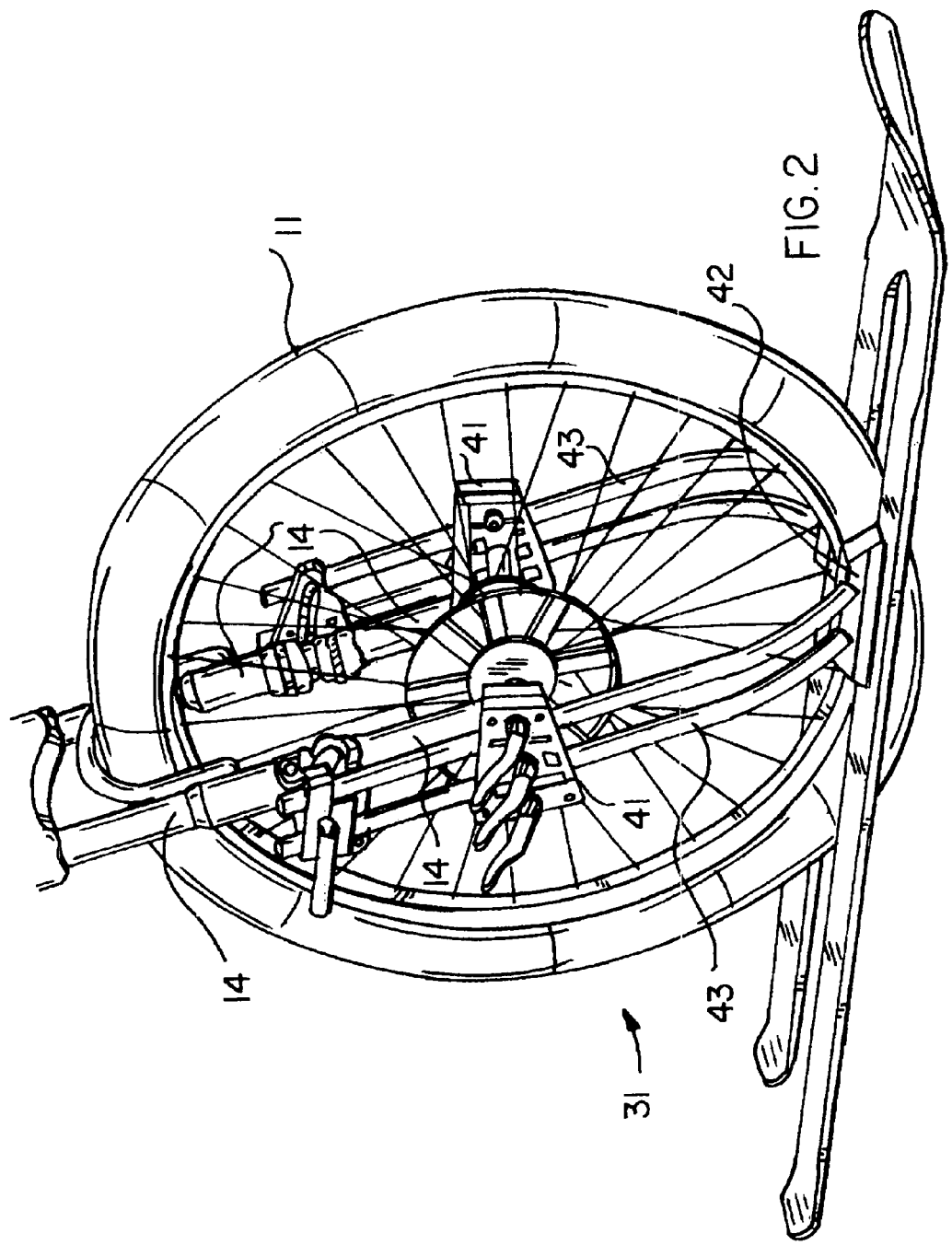

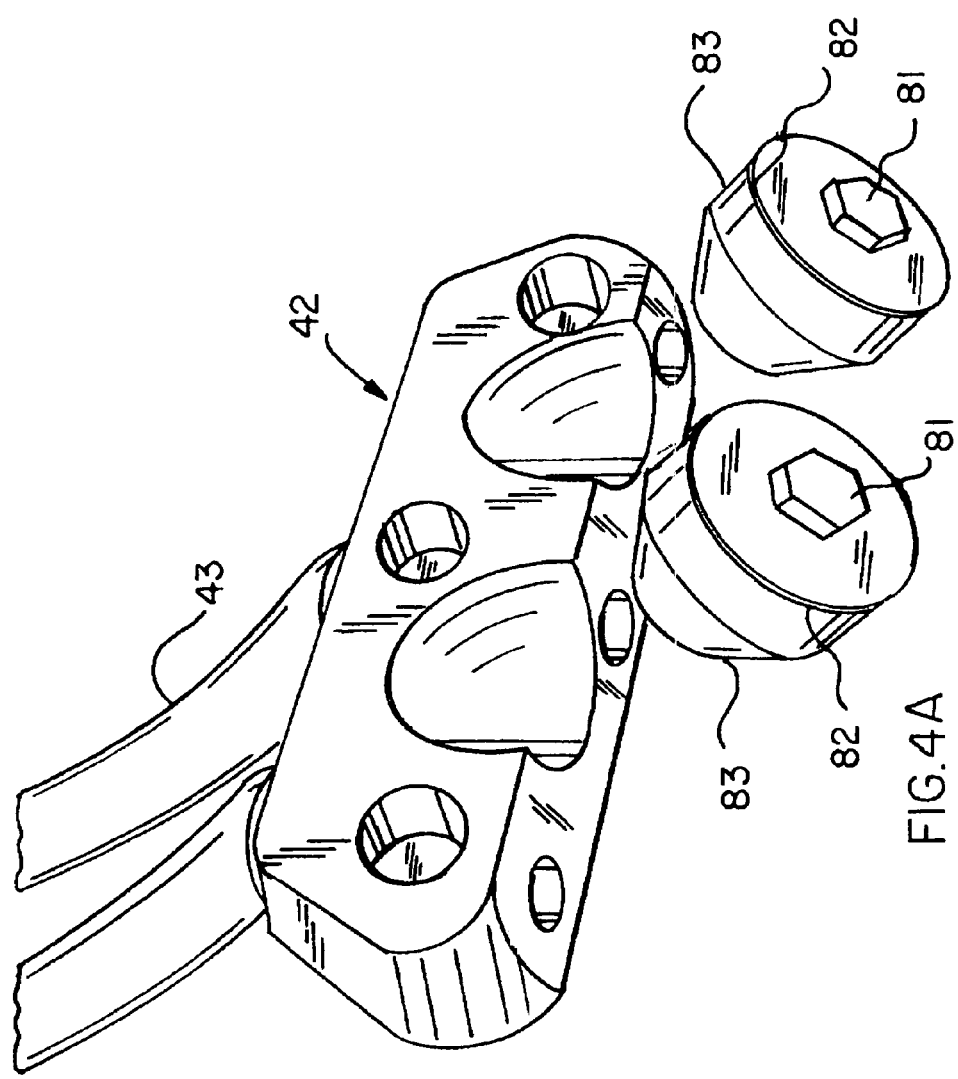

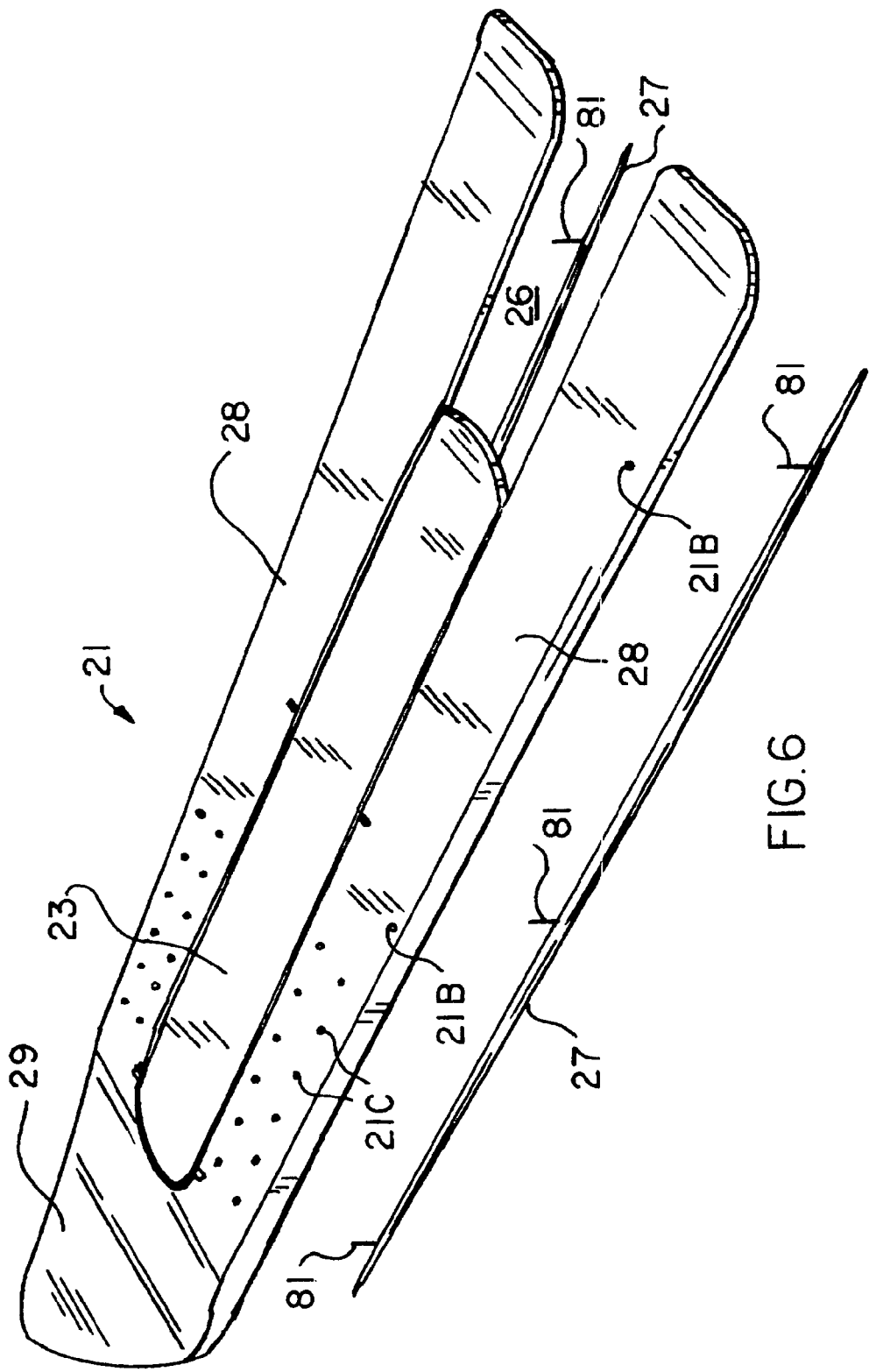

METHODS OF BIKING OR CYCLING ON VARIED SURFACES

CROSS-REFERENCE TO RELATED APPLICATIONS

This application is continuation-in-part of Ser. No. 12/321,238 filed Jan. 15, 2009 now abandoned which claims priority to provisional patent application Ser. No. 60/011,317, filed Jan. 15, 2008.

BACKGROUND OF THE INVENTION

The area of invention is the biking, snowboarding, and skiing industry.

BRIEF SUMMARY OF THE INVENTION

The invention is a method of biking downhill in snow and the bike that allows the method to be pursued. The invention also allows a biker to ride the inventive bike on snow and non-snow surfaces.

BRIEF DESCRIPTION OF THE DRAWINGS

FIG. 2 is a side perspective view of the front wheel of the bike of the invention.

FIG. 4A an exploded view of some of the parts in FIG. 4 of the invention.

FIG. 6 is a partially exploded perspective view of the skiboard of the invention.

DETAILED DESCRIPTION OF THE INVENTION

Figure 1:
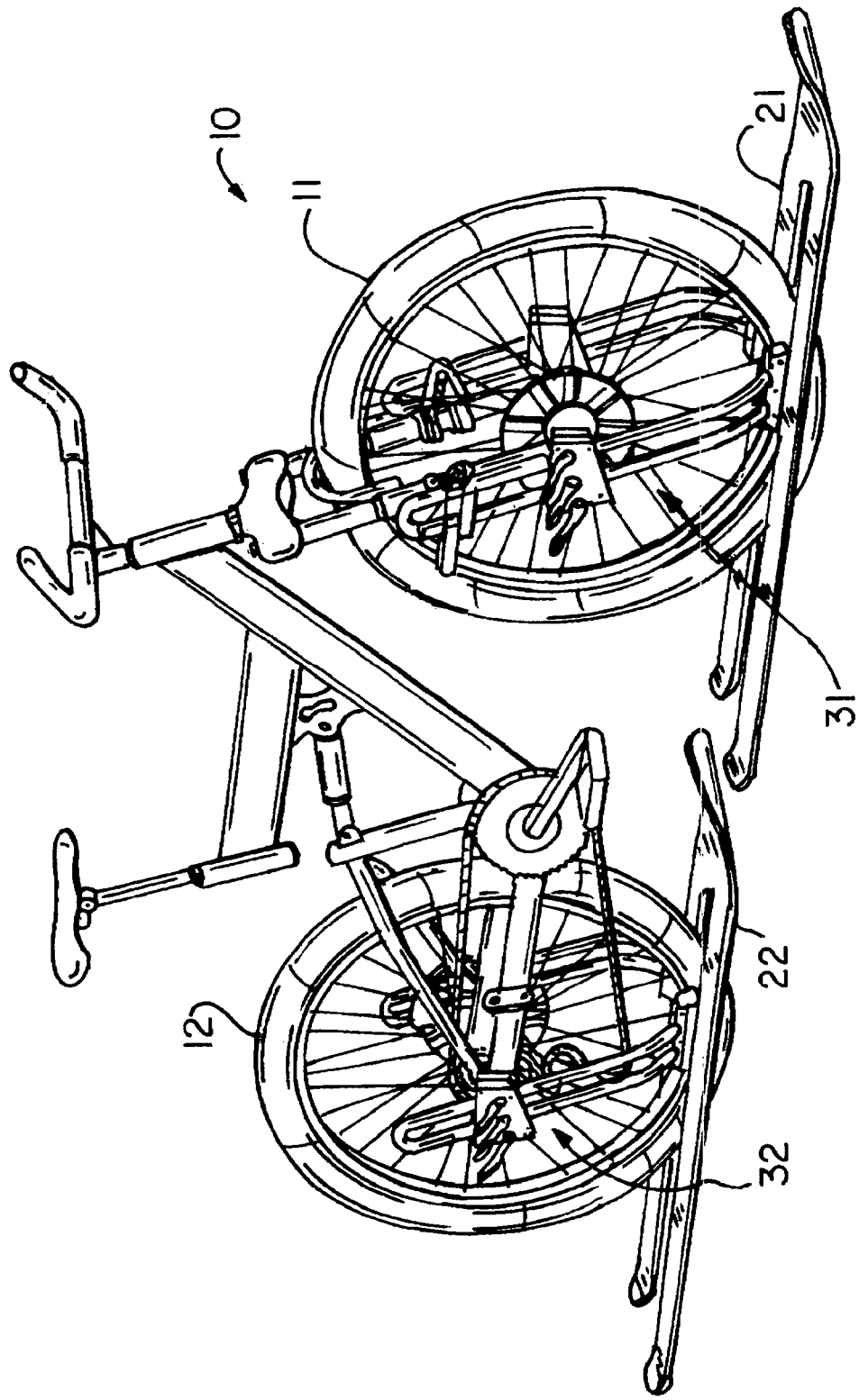
FIG. 1 is a side perspective view of the bike of the invention.
Figure 1A:
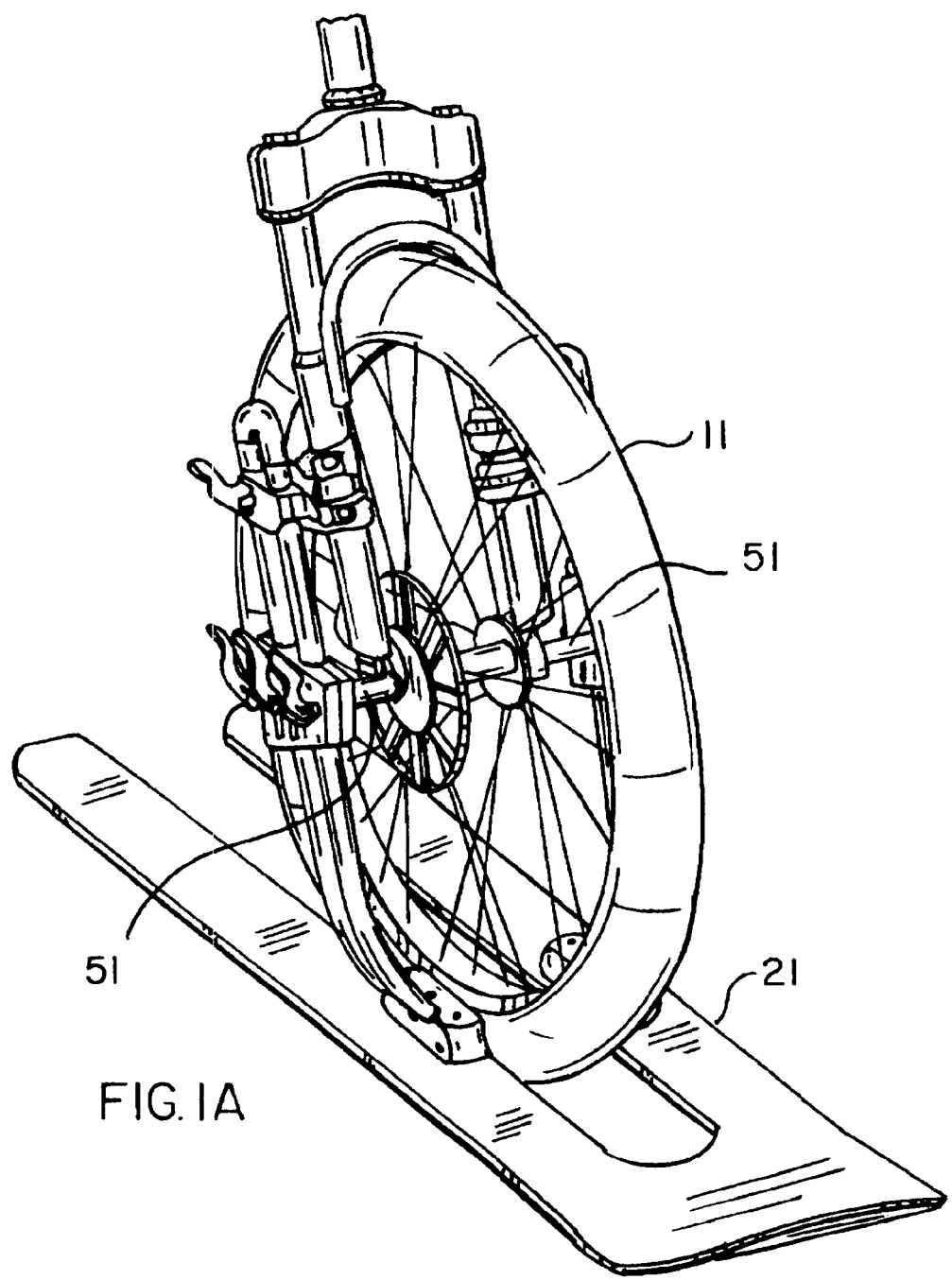
FIG. 1A is a front perspective of the bike of the invention.

FIG. 1 shows a bike 10 with a front wheel 11 and a back wheel 12. The front wheel 11 is provided with a front skiboard 21, and the back wheel 12 is provided with a back skiboard 22. The positioning of the skiboards relative to the wheels is varied by front and back adjustable support means 31 and 32.

A skiboard is a snowboard with a central section 23 of the snowboard removed so that the bike wheel can be positioned through the central section and below the skiboard. A ski board has a pair of mini skis joined at the front or the back by a central member. A pair of small or mini skis that are not joined at the front or the back can be used to replace the skiboard. The skiboard or mini skis provide edge and floatation surfaces on both sides of the front and back heels. It is possible to use the skiboard on the front wheel only.

FIG. 2 shows the front wheel 11, front skiboard 21 and front adjustable support means 31. The support means 31 has two sets of quick release clamps 41 on both sides of the wheel that allow the position of the board relative to the wheel to be quickly varied.

Support means 31 is connected to the skiboard 21 by board mounting means 42 which is mounted to the board 21 and receives and holds tubular members 43 to the board 21. The tire axle is an extended axle 13 which is longer than the original axle. In this embodiment, the extended axle 13 is a quick release skewer axle with a nut 72 and a cam lever 73. The front wheel 11 and axle 13 is connected to the tubular members 43 by quick release clamps 41. Front forks 14 are also connected to the tubular members 43 by quick release clamps 41.

Figure 3:
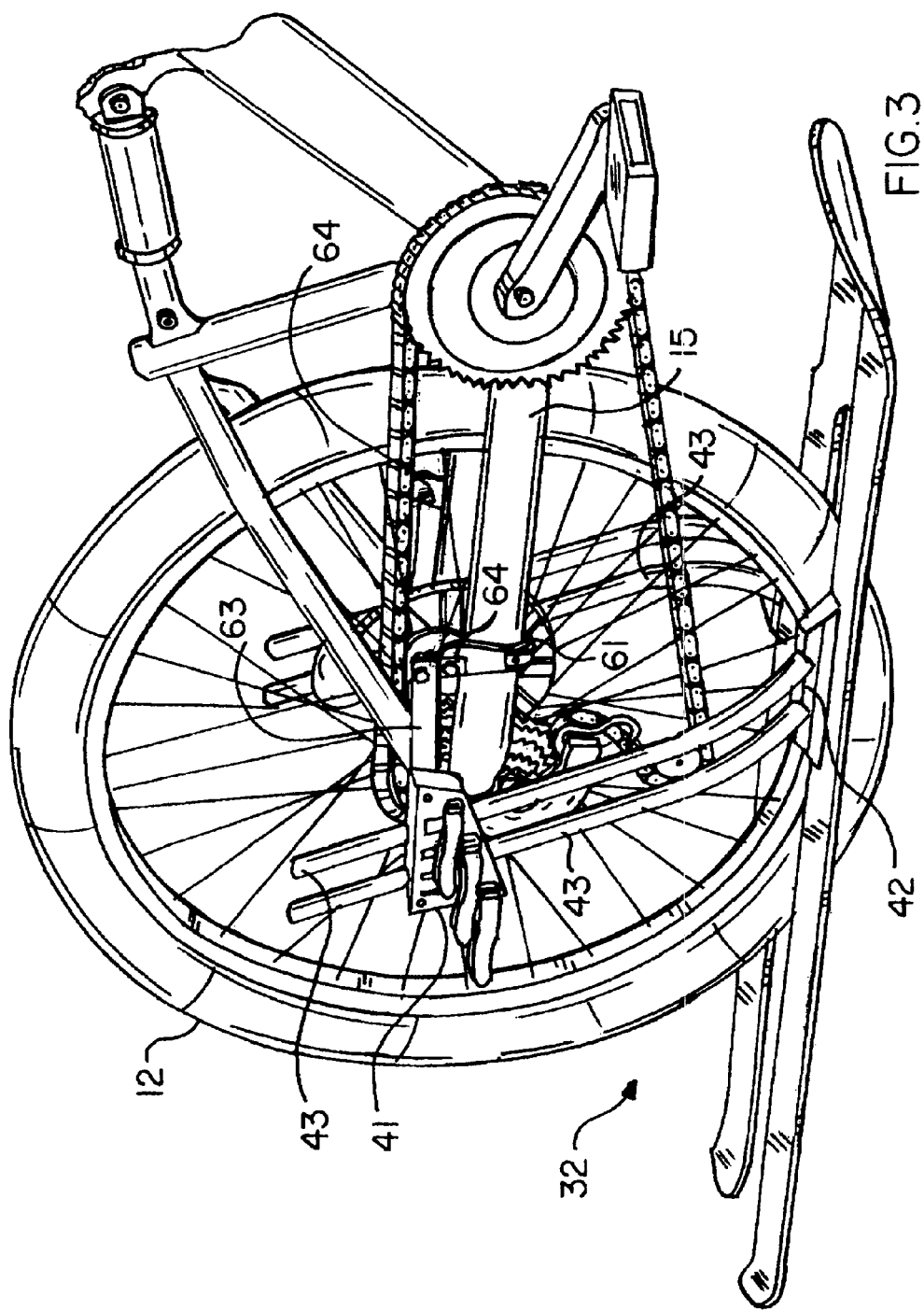
FIG. 3 is a side perspective view of the back wheel of the bike of the invention.

FIG. 3 shows the back wheel 12, back skiboard 22 and back adjustable support means 32. The support means 32 has two sets of quick release clamps 41 on both sides of the wheel that allow the position of the board relative to the wheel to be quickly varied.

Support means 32 is connected to the skiboard 22 by board mounting means 42 which is mounted to the board and receives and holds tubular members 43 to the board 22. The tire axle can be a quick release skewer rod axle 13 with a cam lever 72, such as that made by the BBB Wheel Block, Zipp and Pyramid companies. But, the normal skewer is approximately 5 inches in length. The skewer axle of the invention will be extended to be approximately 10 inches in length. Back wheel 12 and axle 13 is connected to the tubular members 43 by quick release clamp 41. The clamp 41 is positioned on the back wheel skewer 13 and held on the back wheel strut or chain stay 15 by a binder 61. Back support bracket 63 is connected to the binder 61 through a second back support bracket 64 and to the clamp 41 using nuts and bolts.

Figure 4:
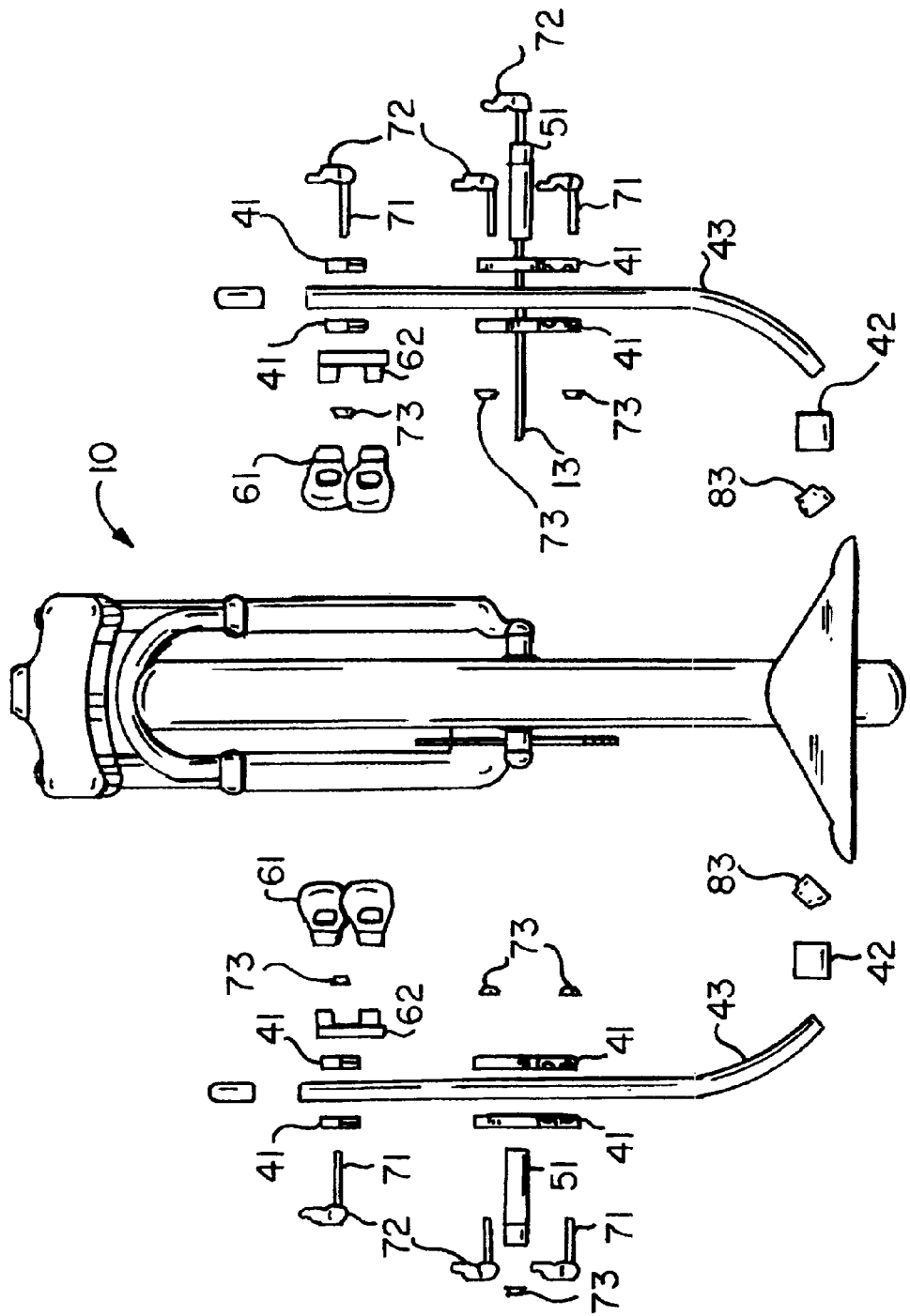
FIG. 4 is an exploded view of the parts attached to the front wheel of the invention.

FIG. 4 shows the elements of the skiboard adjustable support means 31 for the front wheel in an exploded view. Skiboard support means 31 connects to the axle 13 and to the front forks 14. Support means 31 is connected to the skiboard 21 by board mounting means 42 which has holes for tubular members 43 and is mounted to the board by screws, bolts or other fasteners. The tubular members 43 have a threaded end which receives a bolt 81 from the other side of the board mounting means 42. Bolt 81 has a washer 82 and an elastic member 83 which is sized to hold the tubular member 43 to the mounting means 42 (FIG. 4A). Each bolt 81 is screwed into a nut (not shown) that is mounted in the tubular member 43.

The tire axle can be an extended length skewer rod axle 13 as shown. The front wheel 11 and axle 13 is connected to the tubular members 33 by quick release clamps 41. The clamps 41 are spaced from the wheel 11 and are supported by sleeves 51 upon which clamps 41 are positioned with a sliding fit. Sleeve 51 is supported on axle 13 with a sliding fit.

Figure 4B:
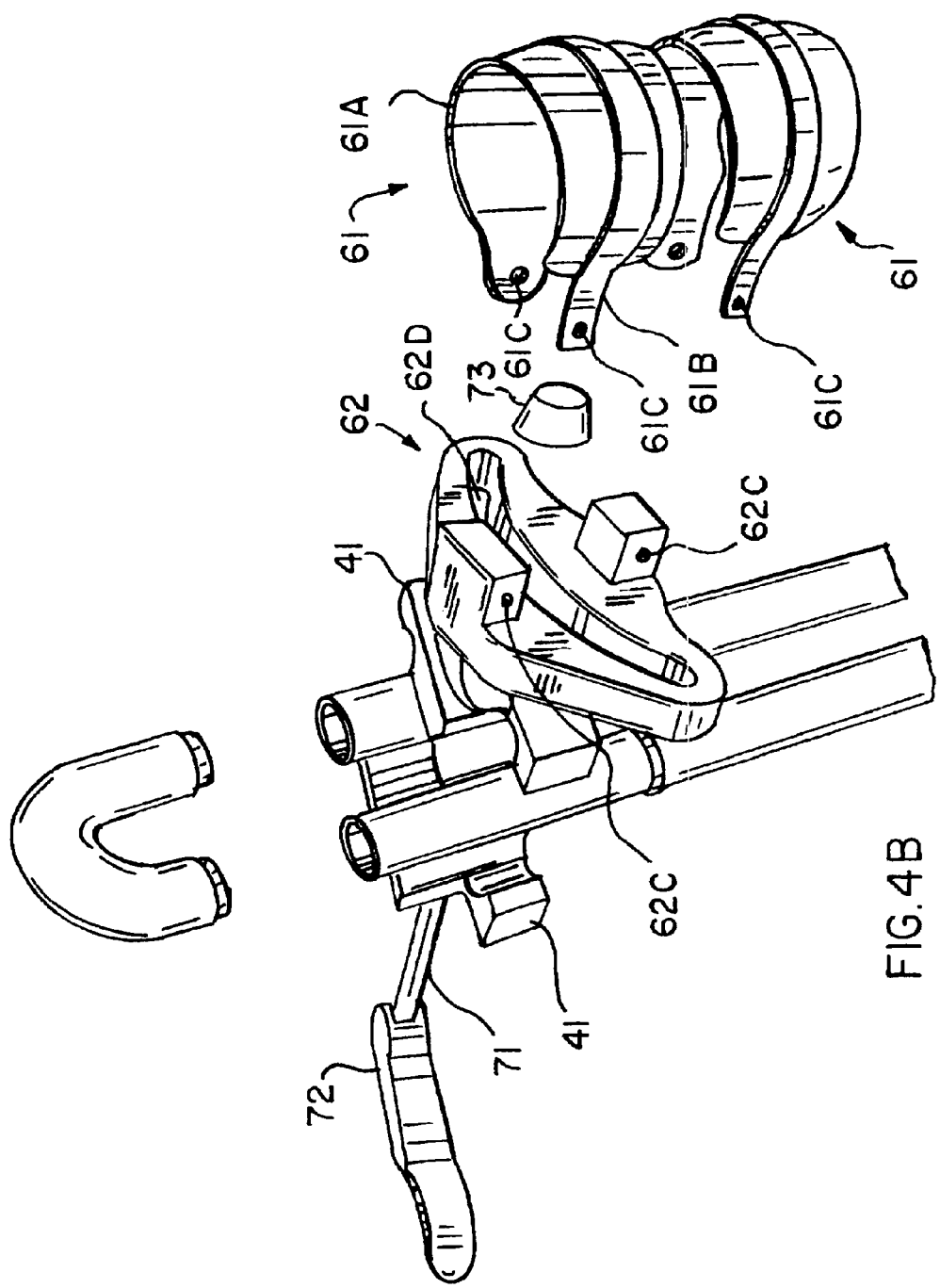
FIG. 4B an exploded view of other of the parts in FIG. 4 of the invention.

Front forks 14 are also connected to the tubular members 43 by quick release clamps 41. Binders 61 and front support bracket 62 connect the clamps 41 to the front forks 14. Binder 61 is U-shaped and fits around the fork 14 and is clamped to the fork by screws passing through holes 61C in the binder into threaded holes 62C in the front support bracket 62. The binder 61 can have padding 61A and a ratchet tightening means 61B similar to those used in snowboarding bindings. Front fork support bracket 62 is connected to clamp 41 by bolt 71 with cam lever 72 and nut 73 (FIG. 4B). The cam lever 72 is similar to and works the same way as in the quick release skewers 13. The cam lever 72 can be replaced by a bolt head. Front support bracket 62 has a curved slot 62D which allows the adjustment of the angle of the front snowboard by releasing cam lever 72 moving the tubular members 43 relative to the support bracket 62 and then tightening the cam lever 72. In powder snow, the angle of the skiboard can be change to an upward angle. In hard packed snow, the angle of the skiboard can be change to a downward angle.

Figure 5:
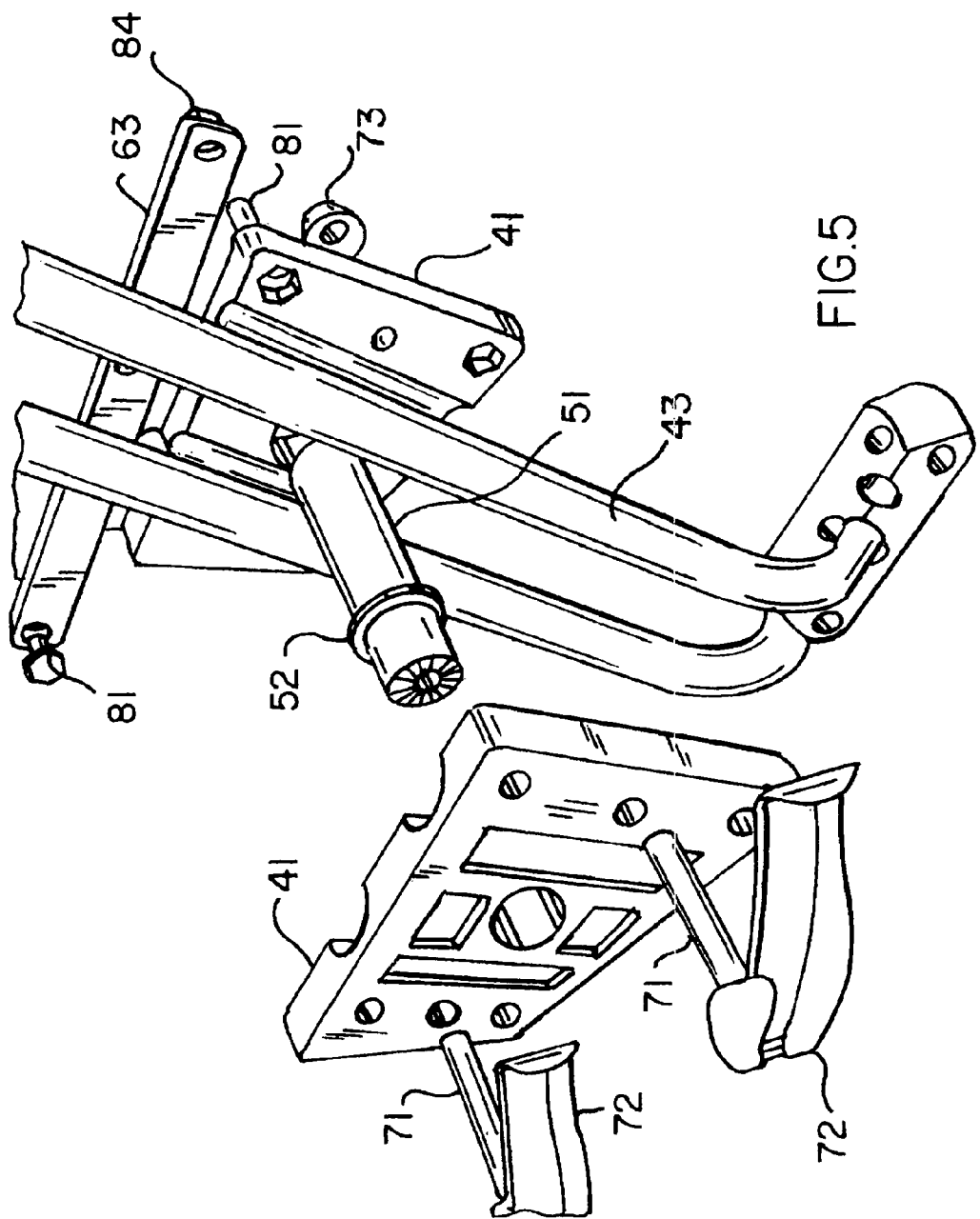
FIG. 5 is an exploded view of the parts attached to the back wheel of the invention.

FIG. 5 shows an exploded view of the back (wheel) adjustable support means 32. Skiboard support means 32 connects to the axle 13. Support means 32 is connected to the skiboard 22 by board mounting means 42 which has holes for tubular members 43 and is mounted to the board by screws, bolts or other fasteners. The tubular members 43 have a threaded end which receives a bolt 81 from the other side of the board mounting means 42. Bolt 81 has a washer 82 and an elastic member 83 which are sized to hold the tubular members 43 to the mounting means 42 (FIG. 4B). Each bolt 81 is screwed into a nut (not shown) that is mounted in the tubular member 43.

The tire axle is an extended skewer rod axle 13 as shown. The back wheel 12 and axle 13 is connected to the tubular members 33 by quick release clamps 41. The clamps 41 are supported by sleeve 51. Sleeve 51 is supported by skewer axle rod 13. Ring 52 is used to set the position of the sleeve 51 relative to the quick release clamps 41. This distance will vary depending on the bike size and the dimensions of the wheel mounting area. Preferably, ring 52 has a slight frictional locking fit on sleeve 51. The clamps 41 are positioned on both sides of the ring 52 and hold the ring when the clamps are set in position. The clamps 41 are secured to the back wheel strut 15 by back support bracket 63. Back support bracket 63 is secured to strut 15 by bolt 81 and nut 84 which connects to a binder around the strut 15 (FIG. 3). Back support bracket 63 is secured to clamp 41 by bolt 81 and nut 84 which connects to the clamp 41.

Figure 6A:
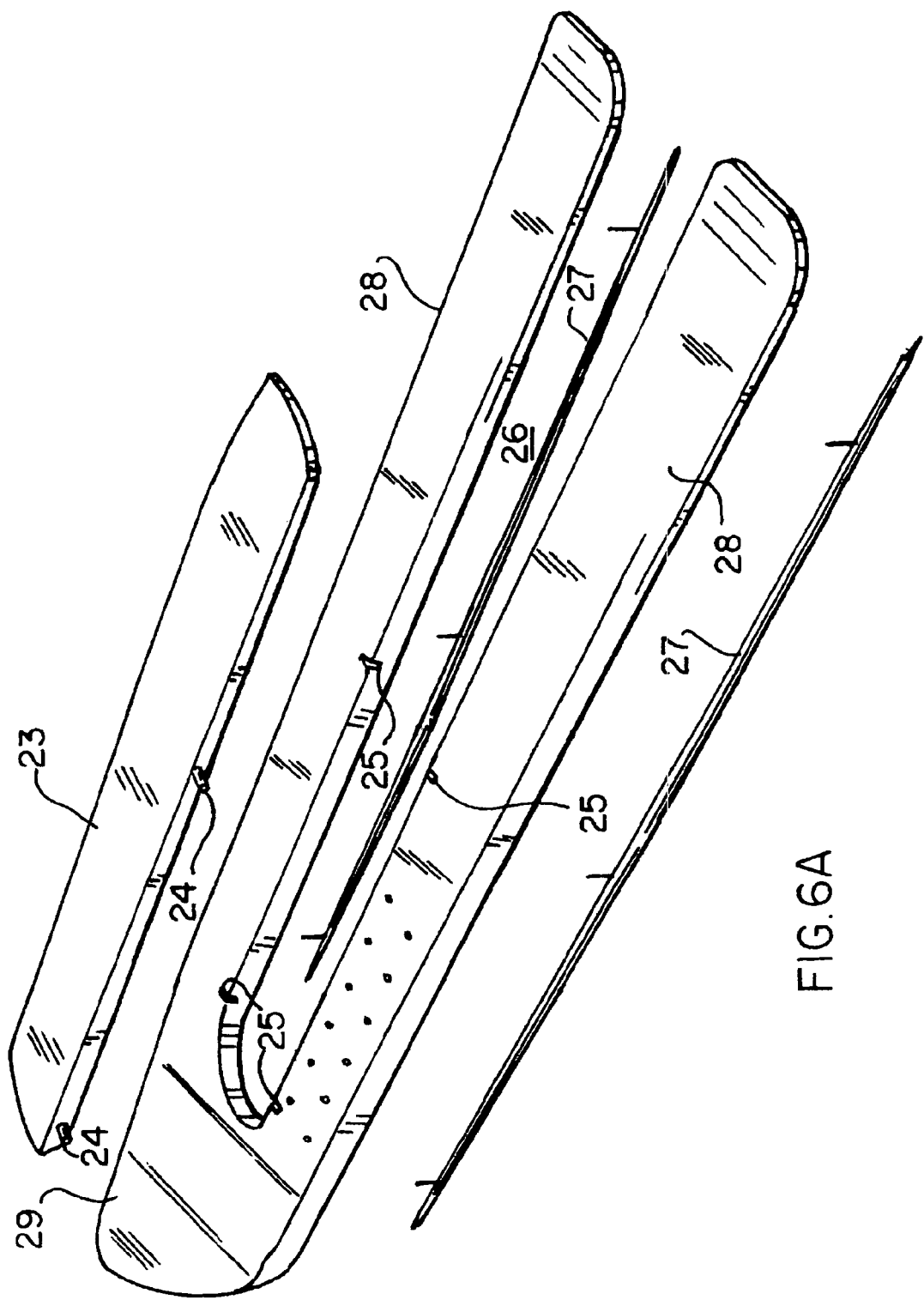
FIG. 6A is an exploded perspective view of the skiboard of the invention.

FIGS. 6 and 6A show partially exploded and exploded views of the skiboards 21,22 of the invention. A skiboard is formed by two skis 28 joined together by a front portion 29 and/or a back portion. Skiboard 21 can have a central section 23 which is supported on the skiboard 21 by pegs 24 which fit into and are supported by grooves 25 in the skiboard. Skiboards 21, 22 can be converted into snowboards by adding this central section 23. The central section can be removed to allow the wheel 11, 12 to pass through the central slot or opening 26 in the skiboards 21, 22. When the central sections 23 are added to the skiboards 21, 22, the wheels 11, 12 are adjusted to hold the central sections 23 in place and allow the bike to travel faster. The skiboards 21,22 can have wear bars or edges 27 added to the bottom of the snowboard and held on by bolts 81 attached to edges 27 and passing through holes 21B and held by nuts (not shown). The edges 27 can be made from metal or plastic and are preferably seated in grooves on the bottom of the skiboards (not shown). The wear bars 27 can be flush with or lower than the bottom of the skiboard. Holes 21C can be provided for securing the board mounting means 42 to the skiboard. The skiboard can be replaced by two separate skis (mini skis).

In the kit form of the invention as shown, the extended axle 13 replaces the original axle. Since there are different types of axles, sleeve 51 will be modified to fit the various axles and bikes. As an example, the extended axle 13 will not be used unless it is replacing an original (OEM) quick release skewer rod as wheel and sleeve 51 fastener.

Alternatively, sleeve 51 can also screw into the original wheel hub stud of a bike after the original nut is removed from the hub. In that case, axle 13 will not be used and only sleeve 51 will be threaded (female thread) on to the original wheel hub (male thread) to fasten the wheel and sleeve 51 to the bike on both sides of the hub.

On a larger axle wheel, a complete extended axle 13 would replace the standard axle and extend out to support the quick release clamps 41 and would not require the two extended sleeves 51 for each wheel.

The bike can be made (OEM) with the skiboards or mini skis and their support provided on the bike. The support for the skiboards can be fixed or adjustable. When the support is non-adjustable or fixed, the same points of connection can be used or the design of the bike can provide cast or welded connections for the support.

The connection of the skiboard adjustment mechanism to the bike is preferably substantially not elastic/inelastic.

The term bike or cycle encompasses bicycles, motor powered bikes, motorcycles, etc.

Methods of Use

The inventive bike is operated like a bike by steering with the front wheel through the use of the handlebars. When the bike is used on different surface conditions, the skiboard/skis are also used to provide steering.

When using the invention, a bike rider can ride on road surfaces by raising the skiboards 21, 22 or skis and using the wheels 11, 12 to ride on the road or dirt surface. With the skiboards raised, the rider can also ride on snow downhill or cross-country depending on the amount the snowboard is raised.

For the fastest traveling on snow downhill, the central section 23 is added to the skiboards, and the wheels are lowered on to the central section 23 to hold the section in place on the skiboard 21, 22. This adjustment of the bike provides less resistance which is better for powder or loose snow conditions.

The adjustment of the skiboard/skis height and angle relative to the wheel can be in very small increments. Alternatively, fewer larger increments can be set into the skiboard adjustment mechanism. The adjustment depends on the condition of the terrain and other considerations, such as the skill of the rider.

The adjustment of the skiboard when going downhill is determined by the snow conditions, the rider's skill and how much wheel traction is desired for braking or pedaling for forward movement.

In softer, looser or wet/mush type conditions, more floatation and less wheel drag is desirable and is provided by using the full skiboard with insert 23 added.

Adding the insert only to front skiboard will provide floatation and lessen the drag on the bike.

Adding the insert to the front only can be used to provide a floating front end which is desired by some riders. This adjustment provides use of the back wheel for braking and pedaling for forward movement.

Adding the insert to both skiboards provides the most floatation and the least resistance which can be useful in conditions, such as powder and mush snow, sand, loose gravel, mud and ice when going downhill.

Having the skiboards higher than the wheels provides greater braking and pedaling on all surfaces/conditions.

This adjustment is especially useful on surfaces, such as hard surfaces, hard packed snow, hard packed sand, frozen ice or mud.

This adjustment will provide variable braking and pedaling depending how much lower the wheels are relative to the skiboards and on the hardness or looseness of the pack of the surface.

This adjustment also provides more stability and provides the turning/tilting of the bike to bring the edges 27 of the skis/skiboard into contact with the riding surface.

The distance that the wheel sinks or digs into the riding surface will determine when the edge 27 and bottom of the skiboard or skis contact the riding surface. More distance or depth of penetration into the riding surface provides more stability. Less distance or depth of penetration provides more speed but less stability.

As an example of the operation of the bike, in a slippery hard pack condition, the front wheel would be used to steer until the wheel slips and then the skiboard would provide steering.

The surface conditions during a 100 foot ride can change markedly from hard to soft. The bike will switch from tire to skiboard steering.

The bike can be used on many differing surfaces, such as snow, ice, dirt, sand and the like. The bike can be used to go downhill and then uphill, downhill, and uphill.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

I claim:

1. A method of biking on a downhill surface using a bike having only a front wheel and a back wheel having sides and a manually powered pedal drive means, comprising the following steps,
   providing the bike with skis on each side of the front and back wheels supported adjustably and inelastically on each side of the front wheel and supported adjustably and inelastically on each side of the back wheel by adjustable support means, the adjustable support means having a quick release hand manipulated clamp to allow adjustment of the skis without tools,
   the adjustable support means being adjustable to multiple positions which are more than two positions,
   adjusting the skis to a first position so that the wheels are lower than the skis,
   pedaling the pedal drive means of the bike to move the bike using the wheels,
   adjusting the skis to a second position so that the wheels are higher than the front and back wheel skis and
   riding the bike on the downhill surface using the front skis to steer.

2. A method of biking on a downhill surface using a bike having only a front wheel and a back wheel having sides and a manually powered pedal drive means, comprising the following steps,
   providing the bike with a skiboard having skis on each side of the front wheel supported adjustably and inelastically on the front wheel and a skiboard having skis on each side of the back wheel supported adjustably and inelastically on the back wheel by adjustable support means, the adjustable support means having a quick release hand manipulated clamp to allow adjustment of the skis without tools,
   the adjustable support means being adjustable to multiple positions which are more than two positions,
   the skiboards having skis which are joined together and a central slot,
   adjusting the skis to a first position so that the wheels are lower than the skis,
   pedaling the pedal drive means of the bike to move the bike using the wheels,
   adjusting the skis to a second position so that the wheels are higher than the front and back wheel skis and
   riding the bike on the downhill surface using the front skis to steer.

3. The method of claim 2 including the steps of
providing a central section which is carried by the skis,
placing the central section on the skis and
lowering the tire onto the central section.

* * * * *